March 9, 1954 G. P. GRIEVE ET AL 2,671,280
DRYING OVEN
Filed Sept. 8, 1951 2 Sheets-Sheet 1
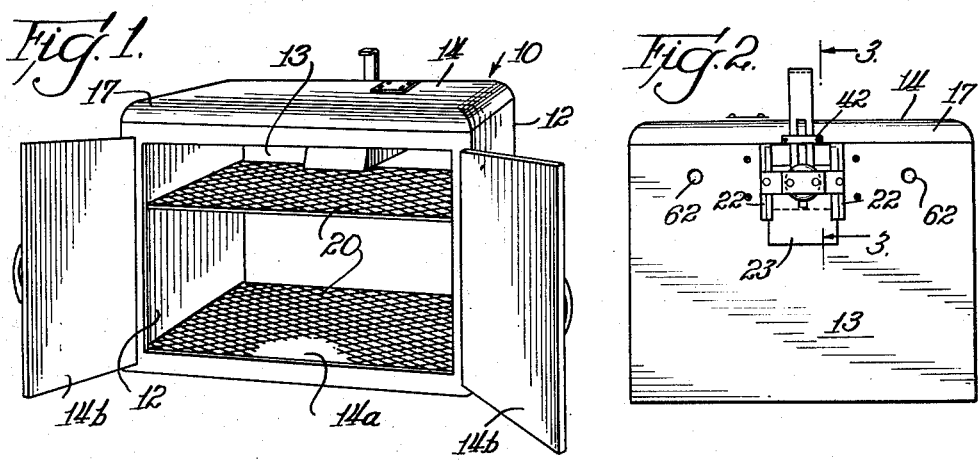
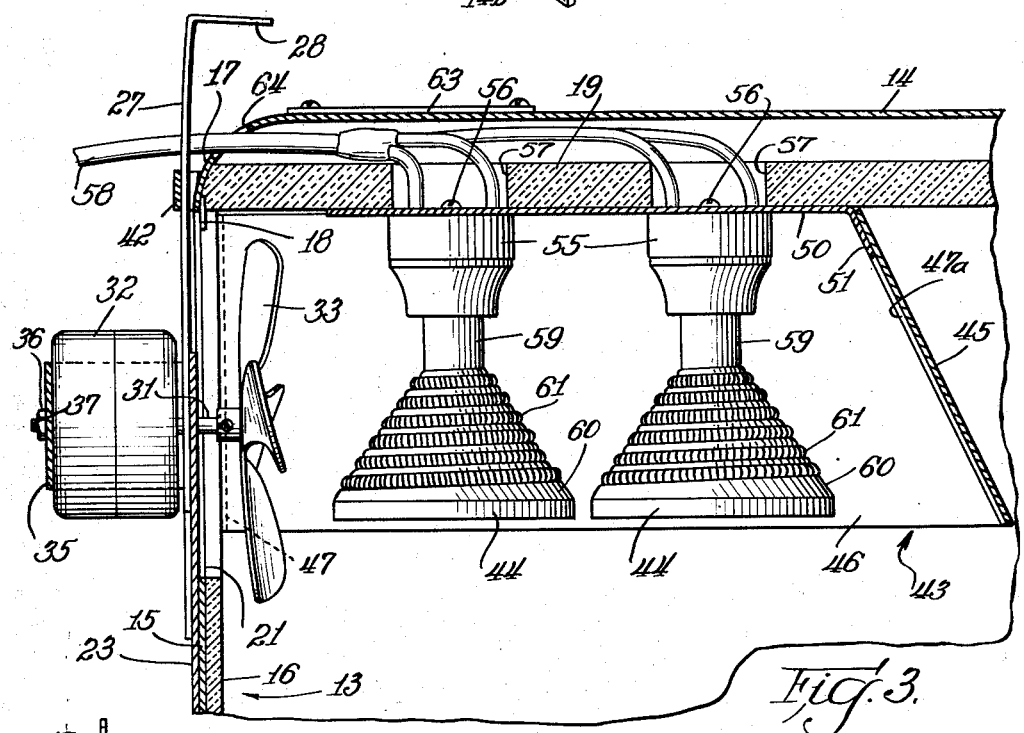
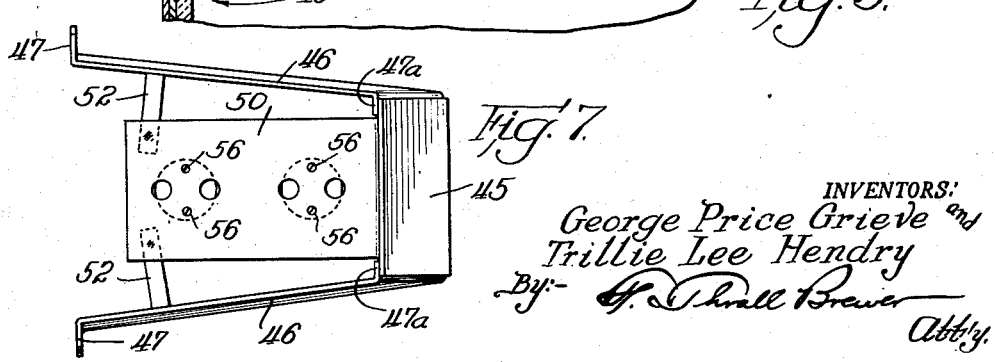
INVENTORS:
George Price Grieve and
Trillie Lee Hendry

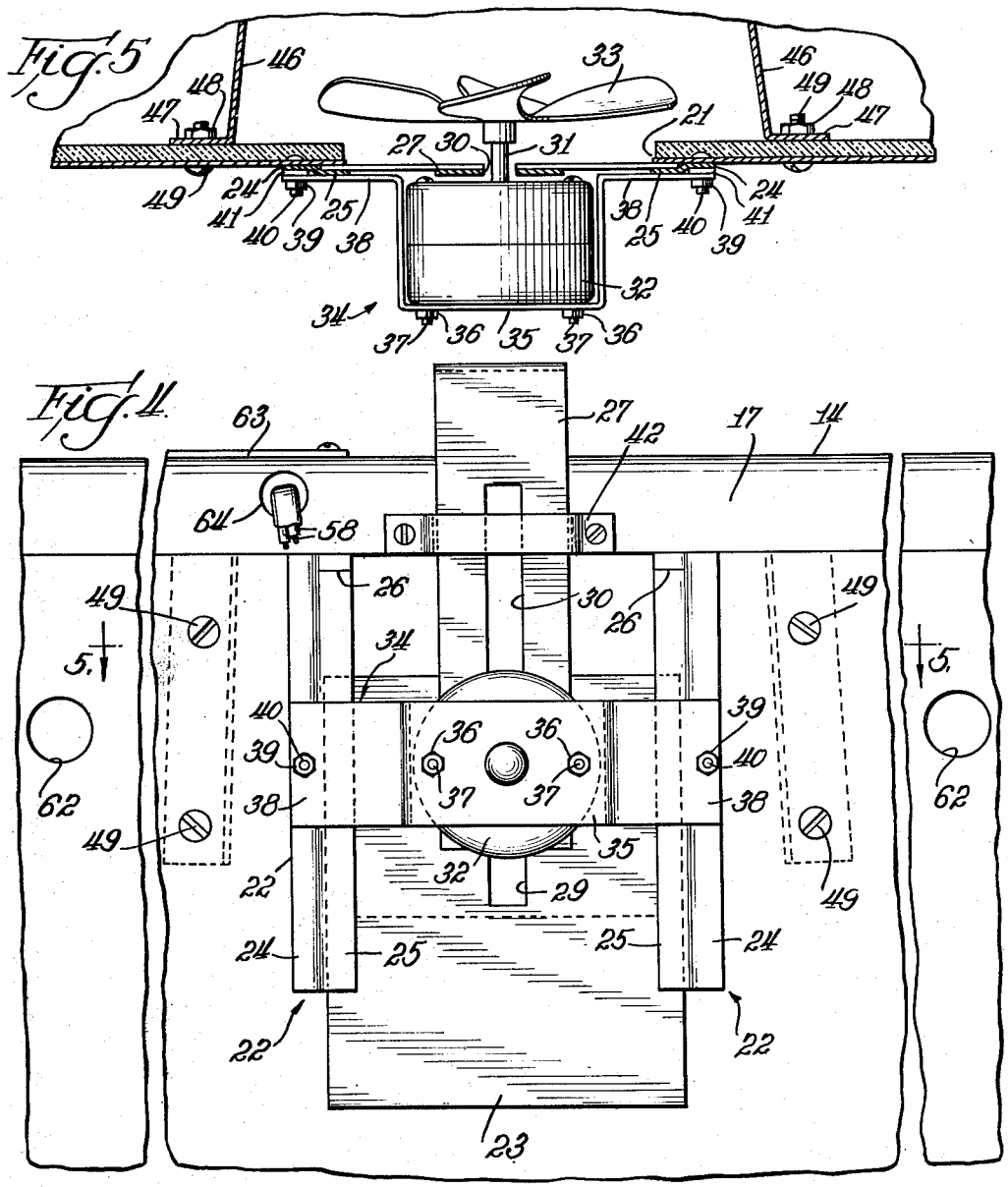

Patented Mar. 9, 1954

2,671,280

UNITED STATES PATENT OFFICE 2,671,280

DRYING OVEN

George Price Grieve, Glenview, and Trillie Lee Hendry, Wood Dale, Ill.

Application September 8, 1951, Serial No. 245,662

13 Claims. (Cl. 34—231)

1

Our invention relates to a drying oven, and more specifically to a hot-air oven in which the temperature is regulated by controlling the amount of air introduced to the oven from the outside.

An object of our invention is to provide a drying oven in which a good circulation of the air and efficient heating throughout the oven are achieved. This result is carried out by propulsion of air through a properly shaped combination heater and air-deflector unit that is appropriately positioned with respect to an air inlet and an air outlet for the oven.

Our invention also has within its purview to provide an improvement in a plug attachment for the heater in the aforesaid unit, which will keep the heater in good electrical contact in spite of tendencies toward looseness due to unequal rates of expansion in heating. This improvement is particularly well suited to a plug of the threaded type.

As another object, our invention comprehends the provision of an adjusting device for an air inlet for a heating oven, whereby the oven temperature is varied. The adjusting device is well adapted for use where there is a mechanism at the air inlet for moving outside air therethrough into the oven. The adjusting device is readily accessible for easy control and can be calibrated to indicate various oven temperatures produced for various openings of the air inlet.

Other objects and advantages of the invention will be apparent from the following description and the accompanying drawings in which similar characters of reference indicate similar parts throughout the several views.

Fig. 1 is a perspective view of an oven embodying our invention, taken from the front or door side, with the doors open;

Fig. 2 is a rear elevation showing the rear of the oven of Fig. 1;

Fig. 3 is a vertical sectional view taken on a line 3—3 of Fig. 2 in the direction of the arrows and shows a combination heater and deflector, motor and fan mounting, and adjustable air inlet, all of which form part of our invention;

Fig. 4 is a rear elevation of a portion of the oven shown in Fig. 2, and depicts the adjustable air inlet and motor mounting of our invention;

Fig. 5 is a horizontal sectional view taken on a line 5—5 of Fig. 4 and in the direction of the arrows and shows the fan and motor mounting, the adjustable air inlet, and the mounting of the heater and deflector unit;

Fig. 6 is a fragmentary elevational view showing the plug of the heater; and

Fig. 7 is a plan view of the heater and deflector unit.

Having reference to the exemplary embodiment of the oven which is shown in the accompanying drawings for illustrative purposes, the oven comprises a container 10 having two opposed side walls 12, a side wall 13 extending between the side walls 12, a top 14, a bottom 14a,

2 and a pair of doors 14b hinged at the ends of the side walls 12 away from the side wall 13. Each of the side walls, as illustrated for the side wall 13 in Fig. 3, comprises a metallic sheet 15 and a heat-insulating layer 16, which may be made of a suitable material such as asbestos. The container 10 is completed by a suitable bottom that is not illustrated. The top has curved flanges 17 at its edges which abut the upper edges of the side walls 12 and 13. A strip 18 overlaps the side walls 12 and 13 and the flanges 17 and is suitably joined as by spot welding to these parts to secure them to one another. The top 14 carries a heat-insulating layer 19 which may be formed of asbestos. The container bottom 14a and doors 14b may also be provided with a similar heat-insulating layer. Reticulated trays 20 for articles to be dried are positioned in the container 10.

The metallic sheet 15 and the heat-insulating layer 16 of the side wall 13 are recessed at their upper edges adjacent the top flange 17 to form an air inlet 21. The side edges of the air inlet are provided with rails 22 which are suitably secured as by welding to the metallic sheet 15 to provide guides for slidably receiving the lateral edges on a wide member 23 which is adapted to regulate the size of the air inlet. Each rail 22 comprises an attaching portion 24 which contacts the metallic sheet 15 and is directly secured thereto, and an off-set portion 25 which is spaced from the metallic sheet so as to provide room for one side margin of the wide member 23. The upper ends of the portions 25 are slitted as indicated at 26 and pressed toward the metallic sheet 15 so as to constitute stops limiting the upward movement of the wide member 23. A narrow member 27 is suitably secured as by welding in overlapping relation to the upper portion of the wide member 23 and extends upward therefrom and above the container top 14, terminating in a flange 28 which extends over the container top and by engagement therewith provides a stop to limit downward movement of the wide member 23.

The wide and narrow members 23 and 27 overlap and have aligned and adjoining slots 29 and 30 which combine to form a single slot that provides room for a shaft 31 as the wide member is adjusted up and down to decrease and increase the size of the air inlet 21. The shaft 31 drivingly connects a motor 32 and a fan 33 and supports the fan on the motor. The fan is within the housing 10, and the motor is outside the housing and is supported by a flanged U-shaped strap 34 within which it is positioned and to the base 35 of the U of which it is secured by nuts 36 and bolts 37. Flanges 38 on the strap 34 are secured to the metallic sheet 15 by nuts 39 and bolts 40 which pass through elements 41 which are positioned in the spaces between the flanges 38 and the attaching portions 24 of the rail elements 22, which spaces occur because of the offset portions 25. A strap 42, which is secured to the flange 17 on the top 14 at the top of the air inlet 21, presses against the narrow member 27 to bend it somewhat as indicated in Fig. 3. The frictional engagement between the strap 42 and the narrow member 27 is sufficient to hold the wide member 23 in any position determined by contact of the member 23 with the bent upper ends on the rail elements above the slits 26 and a lower position determined by contact of the flange 28 on the narrow member 27 with the container top 14.

Positioned in the housing in the path of air moved through the inlet 21 and within the oven by the fan 33 is a combination heater and deflector unit which comprises a hood 43 and a pair of heating units 44. The hood has an inclined end 45 (Figs. 3 and 7) and sides 46 extending from the end 45 in diverging relation and terminating in outwardly directed flanges 47 (Fig. 5), which are secured to the interior of the side wall 13 against the heat-insulating layer 16 by means of nuts 48 and bolts 49. The ends of the sides 46 at the flanges 47 are more widely spaced from one another at their lower edges than at their upper edges at the insulating layer 19 adjacent the housing top 14. Thus the hood 43 is supported from the side wall 13. The sides 46 also have flanges 47a which overlap the end 45 and are secured thereto as by welding. The hood also has to top 50 provided with a flange 51 which is secured in overlapping relation to the end 45. The top 50 extends between the sides 46 along the insulating layer 19 at the top of the housing 10 but terminates short of the housing side 13, as shown in Fig. 3. As shown in Fig. 7, the top 50 is narrower than the end 45 and is spaced from the sides 46, being joined thereto by straps 52.

The top 50 supports the heating units 44, each of which includes, as shown in Fig. 6, an attaching plug having a threaded bushing 53 as one terminal and a coil spring 54 as the other terminal. The plugs are received in sockets 55 which are directly secured to the hood top 50 by screws 56, each bushing 53 being threaded into a ferrule as one terminal in the socket and the coil spring 54 pressing against the other socket terminal. The coil springs 54 as terminals on the plugs assure good electrical contact in spite of any possible looseness that might occur because of wear or unequal expansion of parts during heating. Each bushing is threaded in one direction and the associated coil spring is wound in the opposite direction, whereby when the bushing is threaded into the socket, the coil spring will not thread into engagement with any part in the socket. The insulating layer 19 has openings 57 through which extend conductors 58 connected with the sockets 55. Each heater 44 comprises beside the socket previously mentioned, a non-conducting heat-resistant body 59 provided with a conical portion 60 having a spiral groove in which a coiled heating conductor 61 is wound in spiral of progressively increasing diameter. A removable plate 63 secured to the housing top 14 allows access to the space between the housing top and the insulating layer 19 and inspection of conductors 58. The end 45 and the sides 46 of the hood extend somewhat below the lower ends of the heating units 44.

The side wall 13 is provided with air outlets 62 (Fig. 2) through the metallic sheet 15 and the the heat-insulating layer 16 beyond the hood sides 46 and above the lower edges thereof.

When the oven of the present invention is to be put in operation, articles to be dried are placed on the shelves 20, the doors 14b are shut, the heater units 44 are connected with an appropriate unshown source of electrical power, by the conductors 58 which extend through an opening 64 in the top flange 17 of the housing 10, and the motor 32 is turned on to rotate the fan 33. The wide member 23 is adjusted up or down across the air inlet 21 to regulate its effective opening by manipulation of the narrow member 27. Suitable indicia on the side of the narrow member facing the housing top 14 shows the relative position of the wide member 23 when the indicia is sighted along the housing top. Air sucked through the inlet 21 by the fan 33 passes over the heating units 44 and downwardly out of the hood 43, since the hood end 45 and sides 46 prevent the air from doing other than this. The air then circulates in the oven housing 10 reaching all the articles on the two trays 20. The air can escape only through the outlets 62 which are at a relatively high level, and thus must continue its circulation by moving upwardly to the outlets from the lower regions of the oven housing to which it was directed by the hood 43. The air could not pass directly in any sense of the word from the inlet 21 to the outlets 62, because the hood sides 46 extend between the inlet and the outlets right up to the side wall 13 in which the inlet and outlets are located. The main body of air sucked into the oven by the fan 33 passes above the wide member 23 and beyond the sides of the narrow member 27, although air also passes through the slots 29 and 30 in these members. The bent portions of the air elements 22 above the slits 26 prevent the wide member 23 from reaching the top of the air inlet 21 are defined by the flange 17 on the housing top 14. The air is strongly propelled downwardly and away from the side wall 14 as it leaves the hood, because the horizontal width of the hood decreases in a direction away from the wall 14, the hood end 45 is inclined, and the spacing between the sides 46 at the wall 14 is less at the lower edges than at the upper edges.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. In an oven, a housing having in one side wall near the top an adjustable air inlet and fixed air outlets at opposite sides of the air inlet, a fan positioned in the housing adjacent the inlet, a motor mounted exteriorly on the housing at the inlet, a drive shaft extending through the inlet to connect the motor and the fan, a hood having an open bottom and positioned within the housing with an end spaced from the said side wall and the opposite side wall and sides extending from the said end to the said side wall at opposite sides of the inlet and between the outlets, the sides and ends of the hood extending from the top of the housing below the inlet and the outlets, and heating means positioned in the hood between the fan and the end of the hood.

2. In an oven, a housing having in one side wall an air inlet and air outlets at opposite sides of the air inlet, a fan positioned in the housing adjacent the inlet, a hood open at the bottom and positioned within the housing with an end spaced from the said side wall and the opposite side wall and sides extending from the said end to the said side wall at opposite sides of the inlet and between the outlets, the sides and ends of the hood extending from the top of the housing below the inlet and the outlets, and heating means positioned in the hood between the fan and the end of the hood.

3. In an oven, a housing having in one side wall an air inlet and air outlets at opposite sides of the air inlet, a fan positioned in the housing adjacent the inlet, a hood having an opening at the bottom thereof, said hood being positioned within the housing with an end spaced from the said side wall and the opposite side wall, sides extending from the said end to the said side wall at opposite sides of the inlet and between the outlets, the sides and ends of the hood extending from the top of the housing below the inlet and the outlets, and a top extending along the top of the housing, and heating means positioned in the hood between the fan and the end of the hood, and means mounting the heating means in the top of the hood.

4. In an oven as specified in claim 3, the heating means being electrical and having a threaded end, the means mounting the heating means including a threaded electrical socket receiving the threaded end of the heating means.

5. In an oven as specified in claim 3, the heating means being electrical and having a plug with a threaded bushing as one contact and a spring as the other contact, the means mounting the heating means including a threaded electrical socket receiving the plug of the heating means.

6. In an oven as specified in claim 3, the heating means being electrical and having a plug with a threaded bushing as one contact and a coil spring as the other contact, the bushing thread extending in one direction, the coil spring being wound in the opposite direction, the means mounting the heating means including a threaded electrical socket receiving the plug of the heating means.

7. In an oven unit having a top and a bottom and fixed walls adjoining the top and bottom on three sides, and an air inlet opening in one of said fixed walls, the combination therewith of a hood having a top, two sides, and an end and being open at the opposite end, said open end being mounted over said air inlet opening, heating means positioned in the hood, and means mounting the heating means on the top of the hood.

8. An oven unit as specified in claim 7, the heating means being electrical and having a plug provided with a threaded bushing as one contact and a spring as the other contact, the bushing being threaded in one direction, and the spring being wound in the opposite direction, the mounting means including a threaded socket receiving the plug.

9. An oven unit comprising a hood having a top, two sides, an inclined end wall and an open bottom and end, the sides diverging in a direction away from the end wall, and the top having support means for a heater.

10. An oven unit as specified in claim 9 and further comprising an electrical socket mounted on the top of the hood, the ends of the sides of the hood having greater spacing at their lower edges than at their upper edges and terminating in outwardly directed attaching flanges.

11. In an oven, the combination comprising a housing having an air inlet in one side, a motor positioned exteriorly of the housing at the air inlet, a support for the motor attached to the housing at the air inlet, a fan positioned interiorly of the housing at the air inlet, a drive shaft extending through the air inlet between the motor and the fan to provide a driving connection therebetween and to support the fan on the motor, heating means positioned in the housing in the path of air moved by the fan, a member sliding toward and away from the top of the housing across the air inlet to decrease and increase its size, said member being slotted to receive the drive shaft, said member also having a narrow extension projecting above the top of the housing and terminating in a flange, and a strap secured to the housing and passing across the extension so as to have frictional contact therewith for holding the member in a selected position with respect to the air inlet.

12. In an oven, the combination comprising a housing having an air inlet in one side, a motor positioned exteriorly of the housing at the air inlet, a support for the motor attached to the housing at the air inlet, a fan positioned exteriorly of the housing at the air inlet, a drive shaft extending through the air inlet between the motor and the fan to provide a driving connection therebetween and to support the fan on the motor, heating means positioned in the housing in the path of air moved by the fan, a wide member sliding toward and away from the top of the housing across the air inlet to decrease and increase its size, and a narrow member secured in overlapping relation to the wide member for shifting the same and projecting beyond the top of the housing, and slots being provided in the members so as to constitute a single slot receiving the drive shaft.

13. In an oven, the combination comprising a housing having an air inlet in one side, a motor positioned exteriorly of the housing at the air inlet, a support for the motor attached to the housing at the air inlet, a fan positioned exteriorly of the housing at the air inlet, a drive shaft extending through the air inlet between the motor and the fan to provide a driving connection therebetween and to support the fan on the motor, heating means positioned in the housing in the path of air moved by the fan, a wide member sliding toward and away from the top to the housing across the air inlet to decrease and increase its size, and a narrow member secured in overlapping relation to the wide member for shifting the same and projecting beyond the top of the housing and terminating in a flange for limiting downward movement of the wide member, slots being provided in the members so as to constitute a single slot receiving the shaft, track elements secured at the sides of the air inlet for guiding the wide member, the track elements being cut and bent toward the housing at their upper ends so as to lie in the path of the wide member for limiting its upward movement, and a strap secured to the housing and extending across the narrow member in frictional contact therewith for holding the member in a selected position with respect to the air inlet.

GEORGE PRICE GRIEVE.
TRILLIE LEE HENDRY.

References Cited in the file of this patent

UNITED STATES PATENTS

| Number | Name | Date |
| --- | --- | --- |
| 1,228,635 | Alexander | June 5, 1917 |
| 1,459,912 | Ianieri | June 26, 1923 |
| 1,829,303 | Schaber | Oct. 27, 1931 |
| 2,031,908 | Sawin | Feb. 25, 1936 |
| 2,318,511 | McAllister | May 4, 1943 |